UNITED STATES PATENT OFFICE.

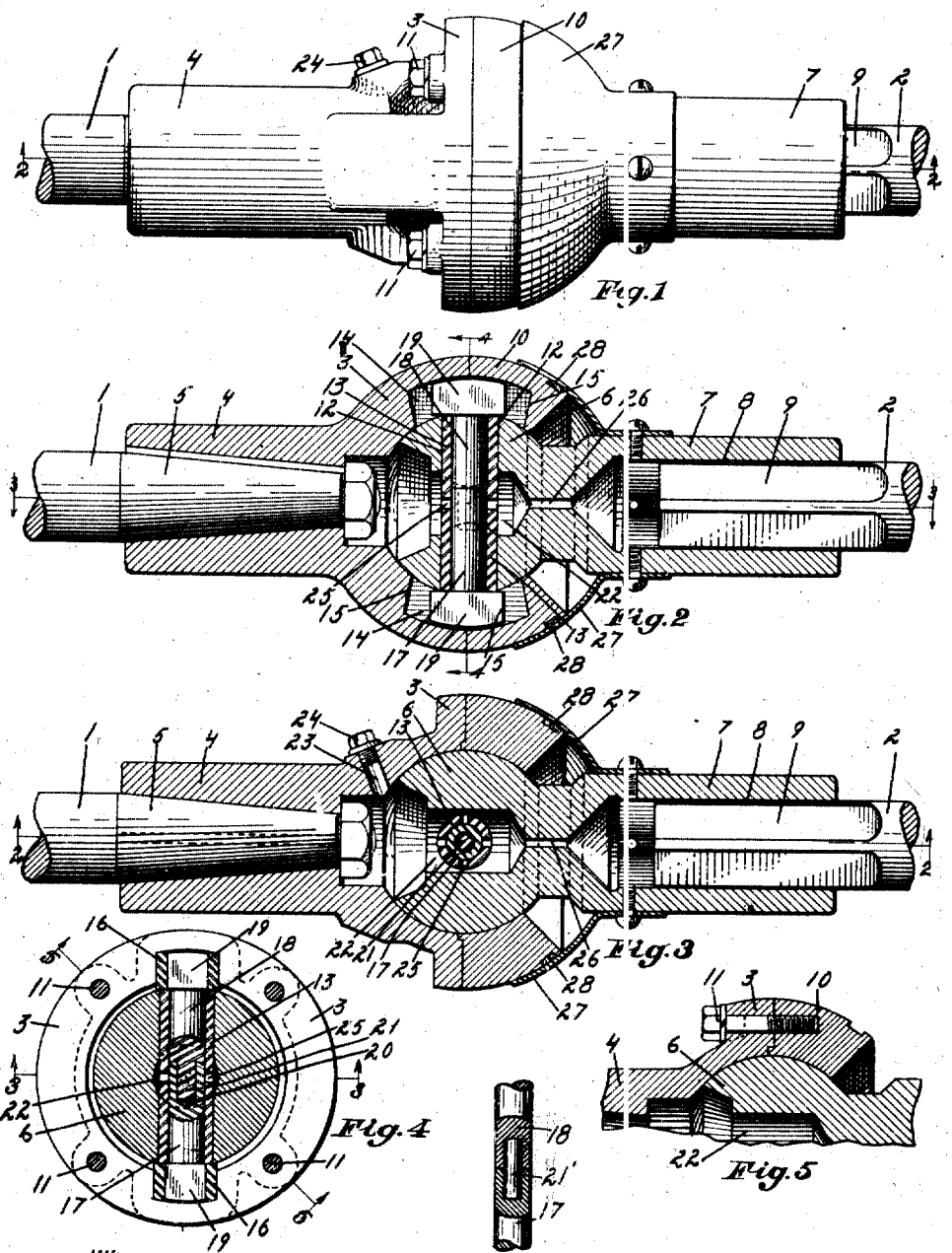

SAMUEL DOUGLASS, OF KALAMAZOO, MICHIGAN, ASSIGNOR TO WILLIAM KROMDYK, JR., OF KALAMAZOO, MICHIGAN.

UNIVERSAL JOINT.

1,222,268.

Specification of Letters Patent.

Patented Apr. 10, 1917.

Application filed June 19, 1916. Serial No. 104,411.

*To all whom it may concern:*

Be it known that I, SAMUEL DOUGLASS, a citizen of the United States, residing in the city and county of Kalamazoo, State of Michigan, have invented certain new and useful Improvements in Universal Joints, of which the following is a specification.

This invention relates to improvements in universal joints.

The main objects of this invention are:

First, to provide an improved universal joint embodying the advantages of a ball and socket and a journal pin joint.

Second, to provide an improved universal joint having these advantages which is simple in its parts and one in which the parts are easily assembled and the wearing parts readily renewed should occasion require.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of a structure embodying the features of my invention, the shaft sections to be joined being broken away.

Fig. II is a detail longitudinal section on a line corresponding to line 2—2 of Figs. I and III, parts being shown in full lines.

Fig. III is a detail longitudinal section on a line corresponding to line 3—3 of Figs. II and IV.

Fig. IV is a detail view, partially in transverse section, on a line corresponding to line 4—4 of Fig. II.

Fig. V is a detail longitudinal section on a line corresponding to line 5—5 of Fig. IV, showing the structural details.

Fig. VI is a detail view showing a modified form of connection for the journal pin members.

In the drawing similar reference characters refer to similar parts throughout the several views, and the sectional views are taken looking in the direction of the little arrows at the ends of the section lines.

Referring to the drawing, 1 and 2 represent shaft sections to be coupled. The socket member 3 is provided with a shank 4 having a tapered bore adapted to receive the tapered end 5 of the shaft section 1.

The ball member 6 is provided with a shank 7 having a squared slip socket 8 adapted to receive the squared end 9 of the shaft section 2 permitting limited longitudinal movement thereof in the shank.

The socket member 3 is provided with an outer section 10 secured to the inner section by means of screws 11, the joint being transverse and centrally of the socket, as best shown in Fig. III. This manner of forming the socket permits convenient assembling and disassembling of the parts.

The ball member 6 is a bearing fit within the socket member and has a transverse bore or opening 12 adapted to receive the journal pin bushing 13. The socket member has segmental bearing ways 14 disposed oppositely and longitudinally across the joint member sections. The end walls 15 of these ways converge inwardly so that when the side bearing plates 16 are arranged therein they are supported against inward movement and effectively retained in place.

The journal pin is formed of sections 17 and 18 having segment-like bearing heads 19 at their outer ends disposed in the bearing ways 14, the heads being a bearing fit between the bearing plates 16. By forming the journal pin in sections it may be introduced into the bushing from opposite ends thereof. The journal pin section or member 17 has a socket 20, while the section 18 has a pin-like portion 21 engaging the socket 20. These parts are, preferably, a close fit, although it is not necessary that they be a drive fit.

The ball member is provided with a lubricant chamber 22 which opens into the socket member which constitutes a lubricant container. The socket member is provided with a passage 23 for the introduction of lubricant, the passage being normally closed by the plug 24.

The bushing 13 is provided with openings 25 which open into the chamber 22 permitting the passage of lubricant to the journal pin. A passage 26 permits the passage of lubricant to the slip pocket 8 so that the parts are properly lubricated at that point.

In Fig. VI, the coupling pin 21' is in the form of a dowel both members 17 and 18 being provided with sockets for the pin.

A spherically curved cap 27 is mounted on the shank 7 of the ball member to coact with the spherically curved socket member which is provided with a packing ring or gasket 28 with which the cap coacts.

With the parts thus arranged, all of the bearings are effectively lubricated.

My improved joint is compact and at the same time is strong and durable and the parts are simple and economical to produce and assemble.

Having thus described my invention, what I claim as new and desire to secure by Letters Patent, is:

1. In a universal joint, the combination of a socket member formed of detachably connected transverse sections and provided with internal segmental bearing ways disposed oppositely and longitudinally across the joint of the sections, side bearing plates for said ways, the end walls of the ways being converged inwardly so that the plates are retained thereby, a ball member having a journal pin opening alined with said bearing ways and a lubricant chamber opening into the socket, said ball member being a bearing fit within said socket member, a bushing arranged in said bearing pin opening and provided with lubricant openings opening to said lubricant chamber, a journal pin having segment-like bearing heads at its ends disposed within said bearing ways of said socket member, said pin being formed of sections adapted to be introduced from opposite ends of the bushing and having a pin and socket joint.

2. In a universal joint, the combination of a socket member formed of detachably connected transverse sections and provided with internal segmental bearing ways disposed oppositely and longitudinally across the joint of the sections, side bearing plates for said ways, the end walls of said ways being converged inwardly so that the plates are retained thereby, a ball member having a journal pin opening alined with said bearing ways, a journal pin having segment-like bearing heads at its ends disposed within said bearing ways of said socket member, said pin being formed of sections adapted to be introduced from opposite ends of said bearing pin opening.

3. In a universal joint, the combination of a socket member provided with internal segmental bearing ways disposed oppositely and longitudinally, a ball member having a journal pin opening alined with said bearing ways and a lubricant chamber opening into the socket, said ball member being a bearing fit within said socket member, a bushing arranged in said bearing pin opening and provided with lubricant openings opening into said lubricant chamber, and a journal pin having segment-like bearing heads at its ends disposed within said bearing ways of said socket member, said pin being formed of separable sections adapted to be introduced from opposite ends of the bushing.

In witness whereof, I have hereunto set my hand and seal in the presence of two witnesses.

SAMUEL DOUGLASS. [L. S.]

Witnesses:
MARGARET L. GLASGOW,
MARTHA J. GREGORY.